March 20, 1956

A. A. WINDSOR 2,739,285

CURRENT MEASURING DEVICE

Filed Jan. 27, 1955

INVENTOR.
ALFRED A. WINDSOR
BY
Roland A. Anderson
ATTORNEY.

INVENTOR.
ALFRED A. WINDSOR
BY
ATTORNEY.

United States Patent Office 2,739,285
Patented Mar. 20, 1956

2,739,285

CURRENT MEASURING DEVICE

Alfred A. Windsor, Berkeley, Calif., assignor to the United States of America as represented by the United States Atomic Energy Commission Application January 27, 1955, Serial No. 484,600

6 Claims. (Cl. 324—117)

The present invention relates to an accurate current measuring device and more particularly to a current marker type of current measuring device utilizing a single peaking transformer.

Heretofore a plurality of peaking transformers have been required to obtain incremental current measurements over a wide range of current change. With such a system of peaking transformers used for marking selected values of current, each transformer functions twice during every cycle of a periodic current. The present invention employs a single peaking transformer which is supplied bias current in discrete increments in response to the current change during each cycle. Such latter system also provides the advantage of flexibility of independently calibrated adjustments of each measurement.

It is therefore an object of the present invention to provide a new and improved current measuring device.

Another object of the invention is to provide a current marking device utilizing a single peaking transformer.

A further object of the invention is to provide a current marking device having a single multibias peaking transformer.

Still another object of the invention is to provide a current marking device for automatically marking discrete incremental changes in current.

Other objects and advantages of the invention will be apparent in the following description and claims considered together with the accompanying drawing in which:

Figure 1:
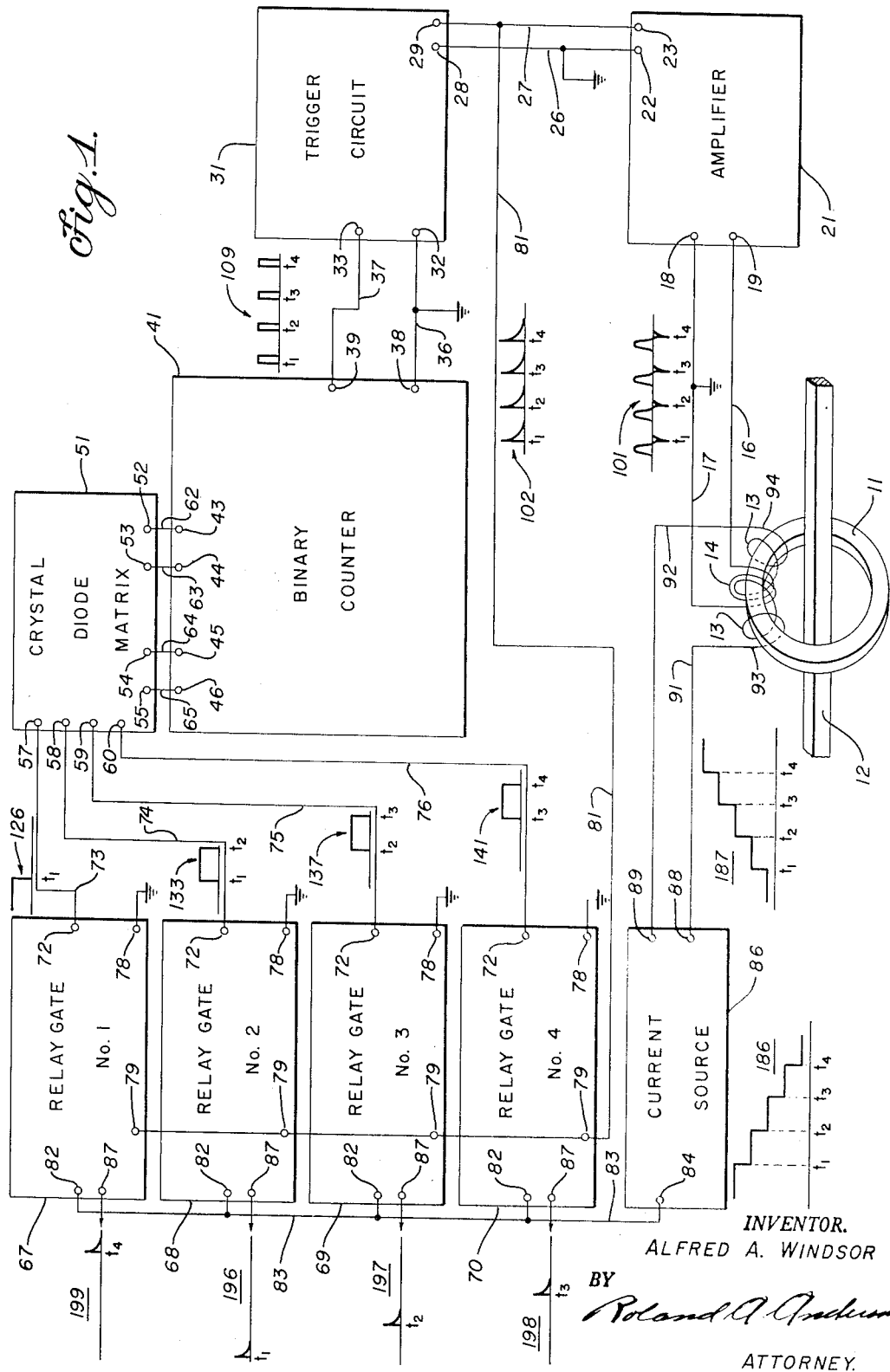
Figure 1 is a schematic block diagram of the invention.

Referring to the drawing in detail, Fig. 1 in particular, there is provided a toroidal core 11 having a current-carrying conductor 12 passing through the central opening of the core as a one-turn winding. Preferably the material of the core is selected to become magnetically saturated at a substantially low value of magnetic flux. A bias winding 13 and a signal winding 14 are wound upon the core 11 and the external circuit connections for such windings will be set forth in detail hereinafter. The foregoing elements comprise a peaking transformer with the conductor 12 serving as the primary winding.

The signal winding 14 is provided with two output conductors 16, 17 which are connected to the input terminals 18, 19 of a conventional pulse amplifier 21. One of the input terminals 18 is connected to ground. The amplifier 21 also has two output terminals 22, 23, one of which (22) is connected to ground. Two conductors 26, 27, respectively, connect the output terminals 22, 23 to input terminals 28, 29 of a conventional trigger circuit 31 as, for example, a self-gated gaseous discharge tube type of trigger circuit. The output of the trigger circuit 31 is developed at two output terminals 32, 33 with one terminal (32) connected to ground and such terminals are connected, respectively, by conductors 36, 37 to two input terminals 38, 39 of a conventional binary counter 41. For the purposes of illustration the binary counter 41 comprises two scale-of-two circuits similar to that illustrated in Fig. 2.41, page 112 of volume V–1, N. N. E. S., entitled "Electronics," by Elmore and Sands, McGraw-Hill. Where desired a greater number of scale-of-two circuits may be utilized in the binary counter 41.

The counter 41 is provided with four terminals 43, 44, 45, and 46 and the internal connections to such terminals will be set forth hereinafter in a more detailed description of the counter. A crystal diode matrix 51 having four input terminals 52, 53, 54, and 55 and four output terminals 57, 58, 59, and 60 are connected with the input terminals 52—55 tied electrically to the terminals 43—46, respectively, of the counter 41 by conductors 62, 63, 64, and 65. Relay gates, Nos. 1–4, 67—70, respectively, are each provided with a terminal 72 separately connected to one of the terminals 57—60 of the matrix 51 by conductors 73, 74, 75, and 76. Each of such relay gates 67—70 is provided with a grounded terminal 78 and a second input terminal 79 with the latter terminal connected to the conductor 27 at the output of the amplifier 21 by a conductor 81.

An output terminal 82 of each of the relay gates 67—70 is connected to a conductor 83 which, in turn, is connected to a terminal 84 of a current source 86. A second output terminal 87 of each of the relay gates 67—70 is provided for ready connection to an indicating device (not shown) such as an oscilloscope or recording meter or to a utilizing circuit. The output of the current source is developed between a first terminal 88 and a second terminal 89 which are respectively connected by conductors 91, 92 to two terminal leads 93, 94 of the bias winding 13 of the peaking transformer.

The foregoing is a general description of the components of the present invention and such components are adapted to operate and provide an indication of incremental increases in the current flow along the conductor 12. When the current flow along the conductor 12 establishes a magnetic flux in the core 11 of such value that saturation occurs, a voltage pulse is developed across the signal winding 14. For time-reference purposes the time $t_1$ is assigned to the commencement time of the first pulse (see waveform 101 of Fig. 1, adjacent conductor 17). The amplifier 21 then impresses the pulse (of waveform 101) in amplified form (see waveform 102) upon the terminals 28, 29 of the trigger circuit 31. As stated previously, the amplifier 21 is of conventional design so that a detailed description of the circuitry is not necessary.

Figure 2:
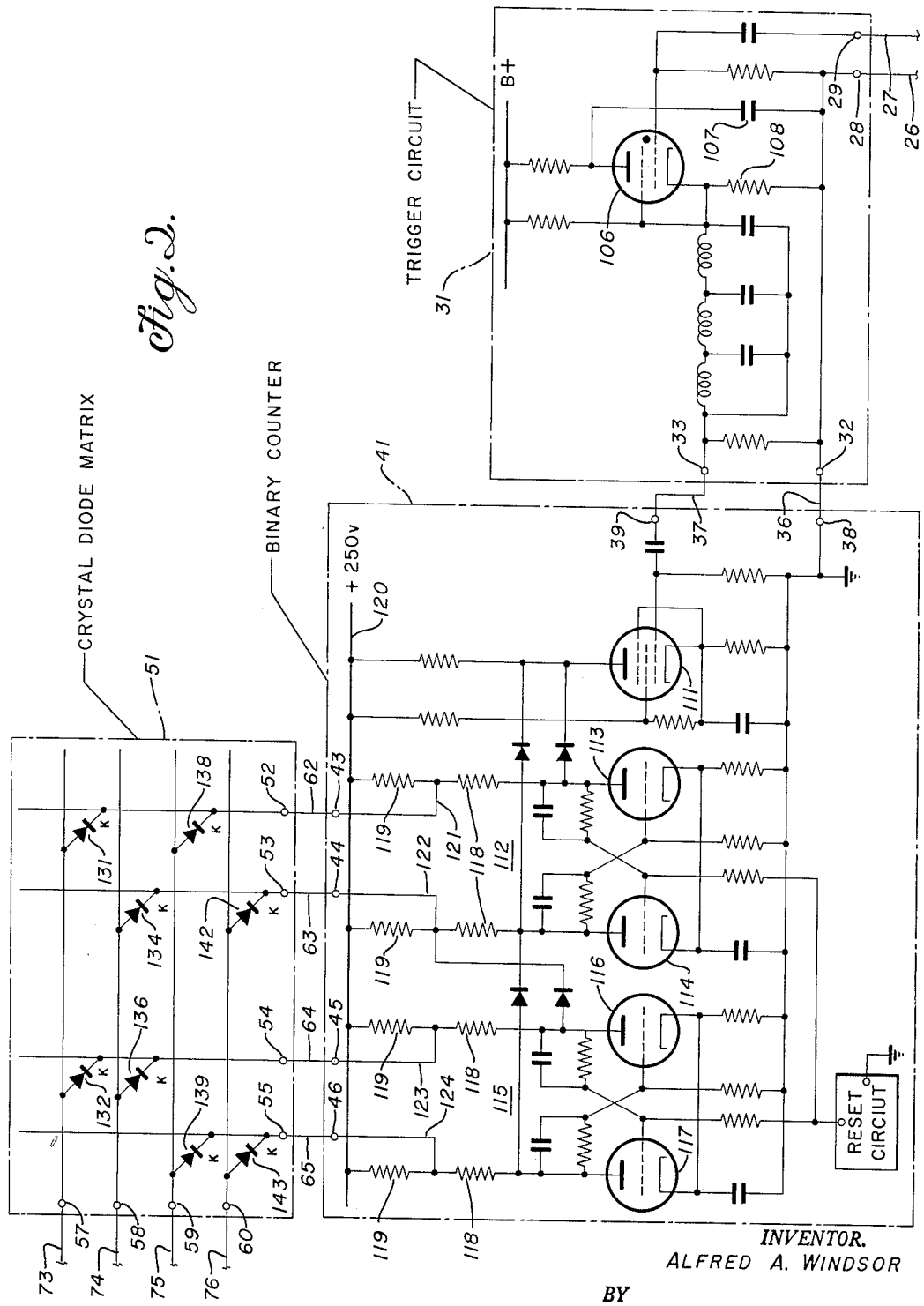
Figure 2 is a wiring diagram of a first portion of the diagram of Fig. 1.

The pulse of voltage impressed upon terminals 28, 29 of the trigger circuit 31 results in the conduction of a gaseous discharge tube 106 to discharge a capacitor 107 until the anode-to-cathode voltage of the tube is less than the conduction voltage (see Fig. 2). The resultant pulse of voltage across a cathode resistor 108 of the tube 106 (see waveform 109 of Fig. 1) is suitably coupled to the output terminals 32, 33.

Conductors 36, 37 transfer the voltage pulse of the ouput terminals 32, 33 in the trigger circuit 31 to the input terminals 38, 39 of the counter 41. The input circuit connected across the terminals 38, 39 includes an inverter tube 111 for developing a pulse of proper phase in response to the input voltage pulse. A first scale-of-two circuit 112 comprising two identical vacuum tubes 113, 114 and a second scale-of-two circuit 115 also comprising two identical tubes 116, 117 are provided and connected to the inverter tube 111 as a scale-of-four counter. Two series-connected resistors 118, 119 are connected between the anode of each of the scalar tubes 113, 114, 116, 117 and a conductor 120 suitably connected to a source (not shown) of positive operating potential. The junction between the two resistors 118, 119 in the anode circuit of each of the scalar tubes 113, 114, 116, 117 is respectively connected to the output terminals 43—46 by conductors 121—124. With such a circuit the pulse of voltage commencing at time $t_1$ as applied to the input terminals 38, 39, results in a reversal in the operation of the tubes 113, 114 of the first scale-of-two circuit 112.

Within the crystal diode matrix 51 the voltages impressed upon the input terminals 52—55 from the counter 41 are suitably combined to provide separate gating voltages of the counter. With the pulse commencing at time $t_1$, a positive gating voltage is initiated at the output terminal 57 (see waveform 126 of Fig. 1). To accomplish the foregoing a first crystal diode 131 is connected between the first input terminal 52 and the first output terminal 57 and a second crystal diode 132 is connected between the third input terminal 54 and the first output terminal. To provide a second gating voltage (see waveform 133 of Fig. 1) a third crystal diode 134 is connected between the second input terminal 53 and the second output terminal 58 and a fourth crystal diode 136 is connected between the third input terminal 54 and the second output terminal 58. A third gating voltage (see waveform 137 of Fig. 1) is developed by utilizing a fifth crystal diode 138 connected between the first input terminal 52 and the third output terminal 59 and a sixth crystal diode 139 connected between the fourth input terminal 55 and the third output terminal 59. For developing a fourth gating voltage (see waveform 141 of Fig. 1) a seventh crystal diode 142 is connected between the second input terminal 53 and the fourth output terminal 60 and an eighth crystal diode 143 is connected between the fourth input terminal 55 and the fourth output terminal 60. In each instance, as described above, the crystal diodes are connected with the polarity as indicated in Fig. 2; that is, the direction of least resistivity is from the input terminals to the output terminals.

As set forth previously, the output terminals 57—60 of the diode matrix 51 are respectively connected to terminals 72 of the four relay gates Nos. 1—4 (67—70). Each of such relay gates 67—70 is substantially the same so that a description of one (67) will be set forth in detail as being typical of the four. One end of a resistor 151 is connected to the terminal 72 and the other end of such resistor is connected to the control grid of a vacuum tube 152. The control grid of such tube 152 is also connected to one end of a second resistor 153, the other end of which is connected to a conductor 154 having impressed a positive voltage from the previously-referenced source (not shown). The value of positive voltage of the latter conductor 154 is selected to be higher than the value of operating voltage for the scalar tubes 113, 114, 116, 117 of the counter 41 as impressed by the conductor 120. The cathode of the vacuum tube 152 is connected through a resistor 156 to a second portion of the conductor 120, so as to impress a voltage equal to that of the operating potential of the scalar tubes 113, 114, 116, 117. A coil 157 of a fast-acting relay 158 is connected between the conductor 154, impressed with positive voltage, and the anode of the tube 152. Thus, during the time the tube 152 conducts current flows through the relay coil 157 to provide energization thereof.

Conduction of the tube 152 in the relay gate No. 1 (67) is controlled by the circuit connected between the positive voltage conductor 154 and the lesser positive voltage conductor 120 in the counter 41 and comprises the two resistors 153, 151, the crystal diodes 132, 131 of the matrix 51, and the anode resistor 119 of the first and third scalar tubes 113, 116 of the counter. Since the crystal diodes 131, 132 are connected into the circuit with the previously-indicated polarity, the potential across the diodes, as impressed from the two positive conductors 120, 154, results in a normal minimum current flow. Such condition of minimum current flow through the crystal diodes 131, 132 causes the voltage drop across the resistor 153 in the relay gate No. 1 to be a minimum to bias the vacuum tube 152 so that the tube conducts and the relay coil 157 is energized. The foregoing state of operation exists prior to the occurrence of the first pulse, commencing at time $t_1$ because at such time the first and third scalar tubes 113, 116 of the counter 41 are in a nonconductive condition.

Now at the time the first pulse $t_1$ of waveform 109 (see Fig. 1) is impressed at the input terminals 38, 39 of the counter 41, the first and second scalar tubes 113, 114 are triggered so that the first tube becomes conductive and the second tube nonconductive. Conduction of the first scalar tube 113 results in a flow of current through the anode resistor 119 in such a direction as to oppose the existing voltage drop thereacross. In such a manner then the voltage across the crystal diode 131 is increased so that a greater value of current flows therethrough and increases the voltage drop across the resistor 153. The result then of the first pulse starting at time $t_1$ is to cut off the conduction of the tube 152 in relay gate No. 1 (67) and de-energize the relay coil 157.

The relay 158 is provided with an electrode 161 having a contact arm 162 with such electrode connected to the grounded terminal 78. The contact arm 162 is linked to the relay coil 157 in a conventional manner so that during the time the coil is de-energized contact is made with a second electrode 163 and during the time the coil is energized contact is made with a third electrode 164. The second electrode 163 of the relay 158 is connected directly to the terminal 87 and through a resistor 166 to the terminal 79. The third terminal 164 of the relay 158 is connected through a precision resistor 167 to the terminal 82. While there is a precision resistor 167 included in each of the relay gates Nos. 1-4 (67—70), each of such resistors has a different value of resistance with the highest value connected in relay gate No. 1 (67) and the lowest value in relay gate No. 4 (70).

Figure 3:
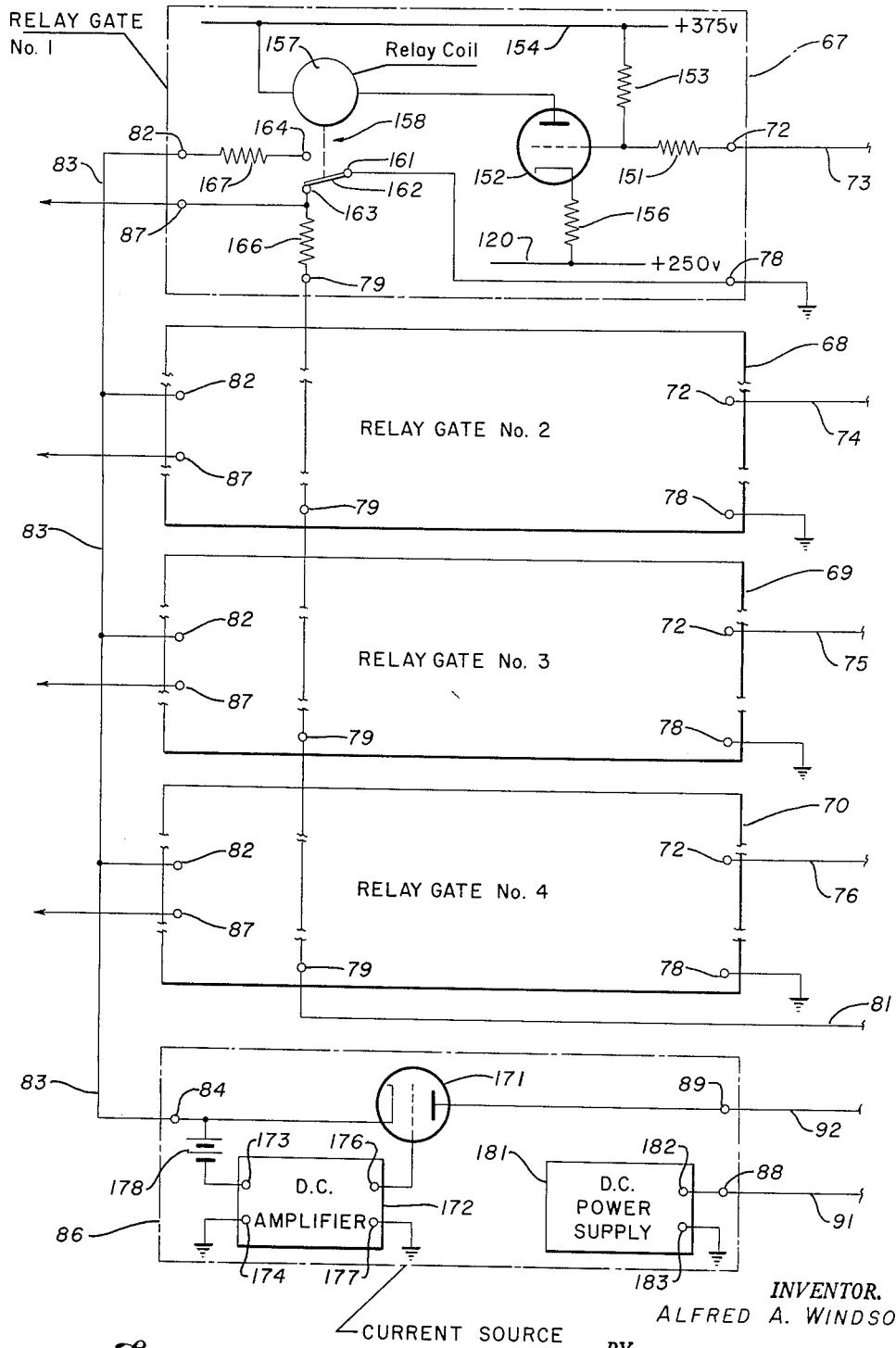
Figure 3 is a wiring diagram of a second portion of the diagram of Fig. 1.

Referring now to the current source 86 (see Fig. 3), the terminal 84 is connected directly to the cathode of a series regulator tube 171, the anode of which is directly connected to the terminal 89. A conventional direct current amplifier 172 is provided having two input terminals 173, 174 and two output terminals 176, 177. A source 178 of constant voltage, indicated on Fig. 3 as a battery, is connected between the input terminal 173 of the amplifier 172 and the terminal 84 with the positive side connected to the terminal 84 while the negative side is connected to the terminal 173. The output of the amplifier 172 is utilized to establish the conductivity of the regulator tube 171 and, to accomplish the same, the output terminal 177 is connected to ground while the other output terminal 176 is connected directly to the control grid of the tube. Also provided within the current source 86 is a conventional direct current power supply 181 having a positive terminal 182 connected to the terminal 88 and a negative terminal 183 connected to ground.

As set forth previously, prior to the first pulse of time $t_1$, the relay coil 157 of the relay gate No. 1 is energized so that the contact arm 162 of the relay 158 connects electrode 164 to the grounded terminal 78. A circuit is then completed which includes the precision resistor 167, the regulator tube 171 of the current source 86, the bias winding 13 of the peaking transformer, and the power supply 181 of the current source. It will be noted that the direct current amplifier 172 provides a bias for the regulator tube 171 so that the tube conducts whenever the cathode circuit of the tube is completed by action of the relay gates Nos. 1-4 (67—70). It is thus provided that a minimum value of current flows through the bias winding 13 of the peaking transformer and for the purposes of the invention such current flow is established to provide a magnetic flux in the core 11 which opposes the flux developed by the flow of current along the central conductor 12 of the peaking transformer.

At the occurrence of the pulse of time $t_1$ at the input of the counter 41, the first scale-of-two circuit 112 is triggered so that the first scalar tube 113 becomes conductive and the second scalar tube 114 becomes nonconductive. The crystal diodes 134, 136, respectively connected between the second output terminal 58 of the matrix 51 and the anode circuits of the nonconducting second scalar tube 114 and third scalar tube 116, conduct by a minimum value to start conduction of the vacuum tube 152 in the relay gate No. 2 (68). Such action results in energization of the relay coil 157 of the relay gate No. 2 to move the contact arm 162 from the electrode 163 to the electrode 164. At the same time $t_1$ the vacuum tube 152 in the relay gate No. 1 (67) becomes cut off to de-energize the relay coil 157 and cause the contact arm 162 to move from the electrode 164 to electrode 163. The precision resistor 167 of the relay gate No. 2 has a lower value of resistance than that of the relay gate No. 1 and so causes a lesser value of voltage at the cathode of the regulator tube 171, as indicated on a waveform 186 of Fig. 1. The other circuit elements of the regulator tube 171 remain fixed and so there is provided a greater value of current flow through the bias winding 13 of the peaking transformer, as indicated by an increased voltage step at time $t_1$ of a voltage waveform 187 of Fig. 1.

Now, as the current flowing along the conductor 12 increases, the flux in the core 11 of the peaking transformer due to such current increases to overcome the opposing flux established by the current flow through the bias winding 13 and finally to magnetically saturate the core. Upon saturation of the core 11 of the peaking transformer a second pulse (assigned the time $t_2$ on waveform 101 of Fig. 1) is developed across the signal winding 14. Such pulse at time $t_2$ is amplified by the amplifier 21 and impressed in amplified form upon the trigger circuit 31. The trigger pulse (see waveform 109) is applied to the binary counter at time $t_2$ and alters the condition of both the first and second scale-of-two circuits 112, 115; that is, the first scalar tube 113 becomes nonconductive, the second scalar tube 114 becomes conductive, the third scalar tube 116 becomes conductive, and the fourth scalar tube becomes nonconductive. The crystal diodes 138, 139, respectively connected between the third output terminal 59 of the matrix 51 and the anode circuits of the nonconducting first scalar tube 113 and fourth scalar tube 117, conduct by a minimum value to start conduction of the vacuum tube 152 in the relay gate No. 3 (69). Such action results in energization of the relay coil 157 of the relay gate No. 3 to move the contact arm 162 from the electrode 163 to the electrode 164. At the same time $t_2$ the vacuum tube 152 in the relay gate No. 2 (68) becomes cut off to de-energize the relay coil 157 and cause the contact arm 162 to move from the electrode 164 to electrode 163. The precision resistor 167 of the relay gate No. 3 has a lower value of resistance than that of the relay gate No. 2 and so causes a lesser value of voltage at the cathode of the regulator tube 171 (see waveform 186 of Fig. 1). The other circuit elements of the regulator tube 171 remain fixed and so there is provided an increased increment of current flow through the bias winding 13 of the peaking transformer (see waveform 187 of Fig. 1).

Again, as the current flowing along the conductor 12 increases, the flux in the core 11 of the peaking transformer due to such current increases to overcome the opposing flux established by the current flow through the bias winding 13 and finally to magnetically saturate the core. The circuit then operates in response to a third pulse (assigned time $t_3$ on waveform 101 of Fig. 1) to alter the condition of the first scale-of-two circuit 112 by rendering the first scalar tube 113 conductive and the second scalar tube 114 nonconductive while the second scale-of-two circuit 115 remains unchanged. The crystal diodes 142, 143, respectively connected between the fourth output terminal 60 of the matrix 51 and the anode circuits of the nonconducting second scalar tube 114 and fourth scalar tube 117, conduct by a minimum value to start conduction of the vacuum tube 152 in the relay gate No. 4 (70). Such action results in energization of the relay coil 157 of the relay gate No. 4 to move the contact arm 162 from the electrode 163 to the electrode 164. At the same time $t_3$ the vacuum tube 152 in the relay gate No. 3 (69) becomes cut off to de-energize the relay coil 157 and causes the contact arm 162 to move from the electrode 164 to electrode 163. The precision resistor 167 of the relay gate No. 4 has a lower value of resistance than that of the relay gate No. 3 and so causes a lesser value of voltage at the cathode of the regulator tube 171 (see waveform 186 of Fig. 1). Since the other circuit elements of the regulator tube 171 remain fixed, an increased increment flows through the bias winding 13 of the peaking transformer (see waveform 187 of Fig. 1).

In accordance with operation of the invention as set forth above, it will be readily apparent that as the current flowing along the conductor 12 increases to a maximum value the core 11 will become magnetically saturated once again. A fourth pulse (assigned time $t_4$ on waveform 101 of Fig. 1) is developed across the signal winding 14 of the peaking transformer and impressed in amplified form upon the trigger circuit 31. The output of the trigger circuit 31 is then connected to the counter 41 where the condition of both scale-of-two circuits 112, 115 is altered; that is, the first scalar tube 113 becomes nonconductive, the second scalar tube 114 becomes conductive, the third scalar tube 116 becomes nonconductive, and the fourth scalar tube 117 becomes conductive. Thus the counter 41 is operating in the same manner as related previously set forth for the time prior to the first pulse of time $t_1$. The result of such action is that the relay 158 of the relay gate No. 1 is operated to include the precision resistor 167 of such gate in the cathode circuit of the regulator tube 171 while the precision resistor 167 of the relay gate No. 4 is removed from the cathode circuit of the regulator tube. Thus the circuit is returned to the originally established condition of operation.

Referring again to the relay gates Nos. 1-4 (67—70), it is to be noted that the conductor 81 connects the output voltage (see waveform 102 of Fig. 1) of the amplifier 21 to each of the relay gates by the external connection to the terminal 79 and the internal connection to the electrode 163 of the relay 158. Since the contact arm 162 of the relay 158 is connected to ground, the terminal 87 of each of the relay gates Nos. 1-4 (67—70) is held at ground potential during the time the relay 158 of each of the relay gates is not energized. In accordance with the foregoing connections and conditions, the pulse of time $t_1$ appears between the terminal 87 and ground of the relay gate No. 2 (68) when the relay 157 of such relay gate is energized (see waveform 196 of Fig. 1). Similarly, pulses corresponding to times $t_2$, $t_3$, and $t_4$ appear singly at the terminals 87 of the other relay gates Nos. 3, 4, and 1 in such order (see waveforms 197—199 of Fig. 1) and may be readily used as an indication of the incremental increases of the current flowing along the conductor 12 by suitable connection to a meter or oscilloscope (not shown).

It is to be noted that the foregoing description of the invention has provided for four marker pulses during the time the current flow along the conductor 12 changes between two extreme values. The extremes of an individual increment is readily established by the value selected for those of the relay gates Nos. 1-4 which sequentially operate in pairs; that is, the precision resistor in the first-operated relay gate sets the lower extreme of the increment while the precision resistor of the next-operated relay gate sets the upper extreme of the increment. Where more than four marker pulses are desired, a counter having a large number of scale-of-two circuits may be readily employed, a matrix circuit having a larger number of crystal diodes is then required which may be readily connected to provide the required number of gating voltages, similar to those waveforms 126, 133, 137, and 141 of Fig. 1, and a larger number of relay gates, similar to those of Figs. 1 and 3.

With the circuit connected in accordance with the foregoing description and the components suitably energized, a first value of current flows through the bias winding 13 of the peaking transformer in such direction as to establish a flux which is in opposition to the flux established by current flow along the conductor 12. Both of such magnetic fluxes are present in the core 11 of the peaking transformer, and as the flux due to increased current flow along the conductor 12 increases the core becomes saturated. At the time of saturation of the core 11, a first pulse, $t_1$ is developed across the signal winding 14 of the peaking transformer. The first pulse, $t_1$, alters the condition of the counter 41 and so, through the diode matrix 51, removes the gating voltage at the relay gate No. 1 and develops a second gating voltage which is impressed upon the relay gate No. 2. The change of gating voltage results in a change in the resistance (resistor 167) of the circuit including the bias winding 13 of the peaking transformer so that a larger value of current flows. As the current flow along the conductor 12 continues to increase, saturation of the core 11 again occurs and a second pulse $t_2$, is developed. The invention then operates in response to the second pulse, $t_2$, in a similar manner to that described for the first pulse, $t_1$, to further increase the current flow through the bias winding 13. In the embodiment illustrated in the drawing, four marker pulses are automatically developed at set current values during the increase in the current flow along the conductor 12.

The present invention has been used to provide as many at ten current marker pulses where the current being measured has varied over a range of 4 to 4000 amperes. The overall accuracy of such measurements has been found to be within 0.05 percent.

While the salient features of the invention have been described in detail with respect to a single embodiment it will be apparent that numerous modifications may be made within the spirit and scope of the invention, and it is therefore not desired to limit the invention to the exact details shown except insofar as they may be defined in the following claims.

What is claimed is:

1. In a current marker system, the combination comprising a peaking transformer having a magnetic core with a bias winding and a signal winding, a conductor carrying a varying current disposed as a one-turn winding of said core, a variable current source connected to said bias winding to provide a flux in said core opposing the flux established by the current of said conductor, and circuit means connected between said signal winding and said current source to provide an incremental change in the output of said current source each time said core becomes magnetically saturated.

2. In a current marker system, the combination comprising a peaking transformer having a magnetically saturable core with a bias winding and a signal winding, a conductor carrying a varying current disposed as a one-turn winding of said core, a variable current source connected to said bias winding to provide a flux in said core opposing the flux established by the current of said conductor, means connected to said signal winding responsive to pulses developed by saturation of said core to provide a separate gating voltage for each pulse, and a plurality of relays connected between said means and said current source to operate sequentially in response to said gating voltages and provide an incremental change in the output of said current source each time said core becomes saturated.

3. In a current marker system, the combination comprising a peaking transformer having a magnetically saturable core with a bias winding and a signal winding, a conductor carrying a varying current disposed as a one-turn winding of said core, a power supply connected in series with said bias winding to provide a current flow to establish a flux in said core opposing the flux established by the current of said conductor, a plurality of resistors having different values disposed for selective connection between said bias winding and said power supply, and circuit means connected between said signal winding and said plurality of resistors to selectively complete the connection of said resistors and provide an incrementally-stepped current through said bias winding in response to magnetic saturation of said core.

4. In a current marker system, the combination comprising a peaking transformer having a magnetically saturable core with a bias winding and a signal winding, a conductor carrying a varying current disposed as a one-turn winding of said core, a power supply connected in series with said bias winding to provide a current flow to establish a flux in said core opposing the flux established by the current of said conductor, a plurality of resistors having different values disposed for selective connection between said bias winding and said power supply, means connected to said signal winding responsive to pulses developed by saturation of said core to provide a separate gating voltage for each pulse, and a plurality of relays connected to said means to operate sequentially in response to said gating voltages and selectively complete the connection of said resistors and provide an incrementally-stepped current through said bias winding.

5. In a current marker system, the combination comprising a peaking transformer having a magnetically saturable core with a bias winding and a signal winding, a conductor carrying a varying current disposed as a one-turn winding of said core, a variable current source connected to said bias winding to provide a flux in said core opposing the flux established by the current of said conductor, a counting circuit connected to said signal winding and responsive to pulses developed by such winding, a diode matrix circuit connected to said counting circuit to provide a plurality of separate gating voltages in time relation with said pulses, and a plurality of relays sequentially responsive to said gating voltages connected between said diode matrix circuit and said variable current source to incrementally change the current flow through said bias winding.

6. In a current marker system, the combination comprising a peaking transformer having a magnetically saturable core with a bias winding and a signal winding, a conductor carrying a varying current disposed as a one-turn winding of said core, a power supply connected in series with said bias winding to provide a current flow to establish a flux in said core opposing the flux established by the current of said conductor, a plurality of resistors having different values disposed for selective connection between said bias winding and said power supply, a counting circuit connected to said signal winding and responsive to pulses developed by such winding, a diode matrix circuit connected to said counting circuit to provide a plurality of separate gating voltages in time relation with said pulses, and a plurality of relays sequentially responsive to said gating voltages connected to said diode matrix circuit and adapted to sequentially complete the connection of said resistors to provide an incrementally changing current flow through said bias winding.

No references cited.